United States Patent
Bakis et al.

(10) Patent No.: US 11,048,870 B2
(45) Date of Patent: Jun. 29, 2021

(54) DOMAIN CONCEPT DISCOVERY AND CLUSTERING USING WORD EMBEDDING IN DIALOGUE DESIGN

(71) Applicant: INTERNATIONAL BUSINESS MACHINES CORPORATION, Armonk, NY (US)

(72) Inventors: Raimo Bakis, Briarcliff Manor, NY (US); David Nahamoo, Great Neck, NY (US); Lazaros C. Polymenakos, West Harrison, NY (US); Cheng Wu, Bellevue, WA (US); John Zakos, Queensland (AU)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 15/841,703

(22) Filed: Dec. 14, 2017

(65) Prior Publication Data

US 2018/0357216 A1    Dec. 13, 2018

Related U.S. Application Data

(60) Provisional application No. 62/516,554, filed on Jun. 7, 2017.

(51) Int. Cl.
| | |
|---|---|
| *G06F 16/00* | (2019.01) |
| *G06F 40/205* | (2020.01) |
| *G06F 16/93* | (2019.01) |
| *G06F 16/903* | (2019.01) |
| *G06F 16/35* | (2019.01) |
| *G06F 40/10* | (2020.01) |
| *G06F 40/30* | (2020.01) |

(52) U.S. Cl.
CPC ............ *G06F 40/205* (2020.01); *G06F 16/35* (2019.01); *G06F 16/903* (2019.01); *G06F 16/93* (2019.01); *G06F 40/10* (2020.01); *G06F 40/30* (2020.01)

(58) Field of Classification Search
CPC .... G06F 16/285; G06F 40/205; G06F 16/903; G06F 16/93; G06F 16/35; G06F 40/10; G06F 40/30
See application file for complete search history.

(56) References Cited

U.S. PATENT DOCUMENTS

| | | | |
|---|---|---|---|
| 8,744,883 B2 * | 6/2014 | Roy | ........................ G06F 16/35 705/7.11 |
| 8,972,376 B1 | 3/2015 | Gailis et al. | |
| 9,244,976 B1 | 1/2016 | Zhang et al. | |

(Continued)

*Primary Examiner* — Hung Q Pham
(74) *Attorney, Agent, or Firm* — Patterson + Sheridan, LLP

(57) ABSTRACT

A system and method performs automated domain concept discovery and clustering using word embeddings by receiving a set of documents for natural language processing for a domain, representing a plurality of entries in the set of documents as continuous vectors in a high dimensional continuous space, applying a clustering algorithm based on a mutual information optimization criterion to form a set of clusters, associating each entry of the plurality of entries with each cluster in the set of clusters through formalizing an evidence based model of each cluster given each entry, calculating a mutual information metric between each entry and each cluster using the evidence based model, and identifying a nominal center of each cluster by maximizing the mutual information.

19 Claims, 5 Drawing Sheets

(56) References Cited

U.S. PATENT DOCUMENTS

| | | | |
|---|---|---|---|
| 2005/0100929 A1* | 5/2005 | Najarian | G16B 25/00 |
| | | | 435/6.16 |
| 2014/0236572 A1 | 8/2014 | Meshulam et al. | |
| 2016/0170982 A1* | 6/2016 | Djuric | G06F 16/353 |
| | | | 707/740 |
| 2016/0321357 A1* | 11/2016 | Novacek | G06F 16/35 |
| 2017/0293842 A1* | 10/2017 | Buchanan | G06N 5/022 |
| 2018/0349388 A1* | 12/2018 | Skiles | G06F 3/0482 |

* cited by examiner

TABLE I. Words Clustered as AILMENTS with Word2Vec Embeddings

| | | | | |
|---|---|---|---|---|
| hypertension | hypothyroidism | allergies | hypertensive | chronic |
| schizophrenia | psoriasis | urticaria | tinnitus | illness |
| diabetes | depression | disorder | disease | diagnosis |
| epilepsy | gout | osteoporosis | cancer | allergic |
| symptoms | allergy | glaucoma | acne | hayfever |
| asthma | migraines | rhinitis | illnesses | sinusitis |
| eczema | dementia | anaphylaxis | cholesterol | hallucinations |
| symptom | diseases | prognosis | metastatic | macular |
| insulin | folate | stroke | renal | glucose |
| bipolar | goitre | neuropathy | cataracts | sickness |
| dermatitis | cardiovascular | mellitus | menopause | infection |
| treatments | hepatitis | ailments | delusions | strokes |
| blindness | deafness | syndrome | mild | polyps |
| diagnosed | medication | prognosis | peptic | incontinence |
| acute | condition | treatment | drug | anxiety |

FIG. 3

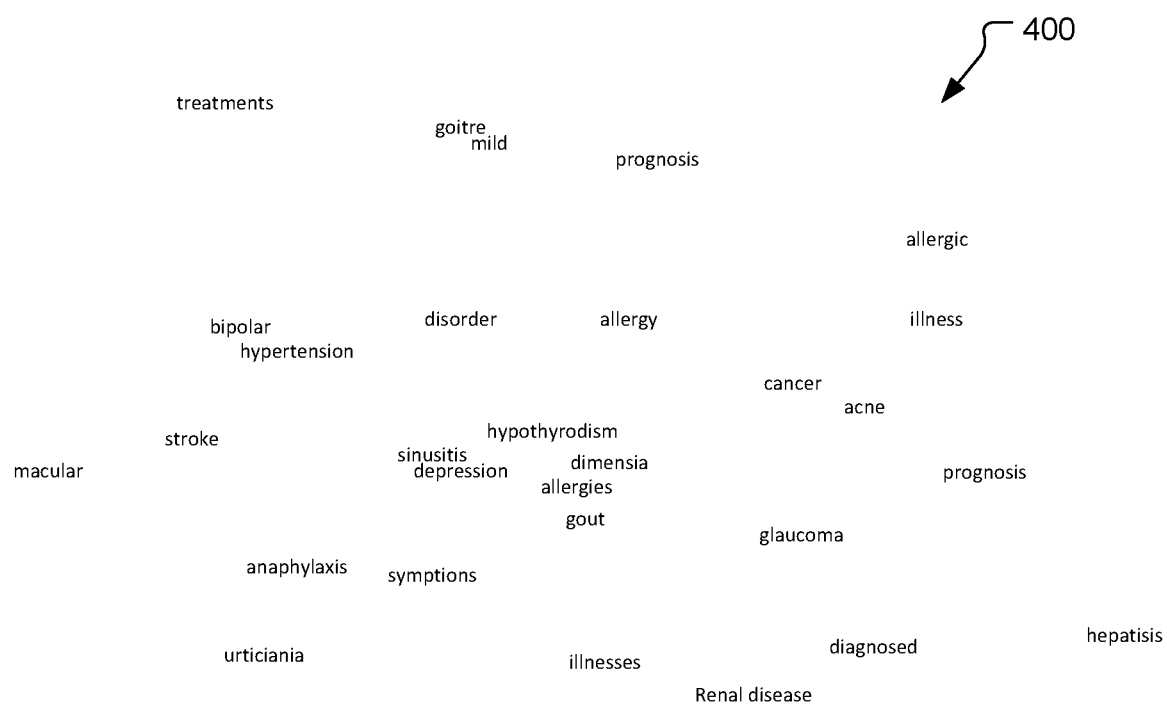

FIG. 4

DOMAIN CONCEPT DISCOVERY AND CLUSTERING USING WORD EMBEDDING IN DIALOGUE DESIGN

I. CROSS-REFERENCE TO RELATED APPLICATIONS

This application claims priority from U.S. Provisional Patent Application No. 62/516,554, filed Jun. 7, 2017, which is incorporated herein by reference in its entirety.

II. FIELD OF THE DISCLOSURE

The present disclosure relates generally to computer implementations, and more particularly, to artificial intelligence and computational linguistics.

III. BACKGROUND

Human computer dialogue systems provide natural language based interface that allows a computer to meaningfully process human language. A system may automate tasks involved in the extraction of relevant information and structure from a domain corpus (e.g., language samples). The extracted information is applied to a dialog design. Semantic parsing, entity, and relation extraction have been applied to this task.

IV. SUMMARY OF THE DISCLOSURE

According to a particular embodiment, a method to perform automated domain concept discovery and clustering using word embeddings includes receiving a set of documents for natural language processing for a domain, representing a plurality of entries in the set of documents as continuous vectors in a high dimensional continuous space, applying a clustering algorithm based on a mutual information optimization criterion to form a set of clusters, associating each entry of the plurality of entries with each cluster in the set of clusters through formalizing an evidence based model of each cluster given each entry, calculating a mutual information metric between each entry and each cluster using the evidence based model, and identifying a nominal center of each cluster by maximizing the mutual information.

According to another particular embodiment, an apparatus may include a memory storing program code and a processor configured to access the memory and execute the program code to receive a set of documents for natural language processing for a domain, represent a plurality of entries in the set of documents as continuous vectors in a high dimensional continuous space, apply a clustering algorithm based on a mutual information optimization criterion to form a set of clusters, associate each entry of the plurality of entries with each cluster in the set of clusters through formalizing an evidence based model of each cluster given each entry, calculate a mutual information metric between each entry and each cluster using the evidence based model, and identify a nominal center of each cluster by maximizing the mutual information.

Another embodiment may include a program product to perform automated domain concept discovery and clustering using word embeddings, the program product comprising a computer readable storage medium having computer readable program code embodied therewith, the computer readable program code being executable by a processor to receive a set of documents for natural language processing for a domain, represent a plurality of entries in the set of documents as continuous vectors in a high dimensional continuous space, apply a clustering algorithm based on a mutual information optimization criterion to form a set of clusters, associate each entry of the plurality of entries with each cluster in the set of clusters through formalizing an evidence based model of each cluster given each entry, calculate a mutual information metric between each entry and each cluster using the evidence based model, and identify a nominal center of each cluster by maximizing the mutual information.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 3 shows a table of clustered data as may be generated by the system of FIG. 1;

FIG. 4 shows a graphical depiction of clustered data as may be generated by the system of FIG. 1;

V. DETAILED DESCRIPTION

Figure 1:
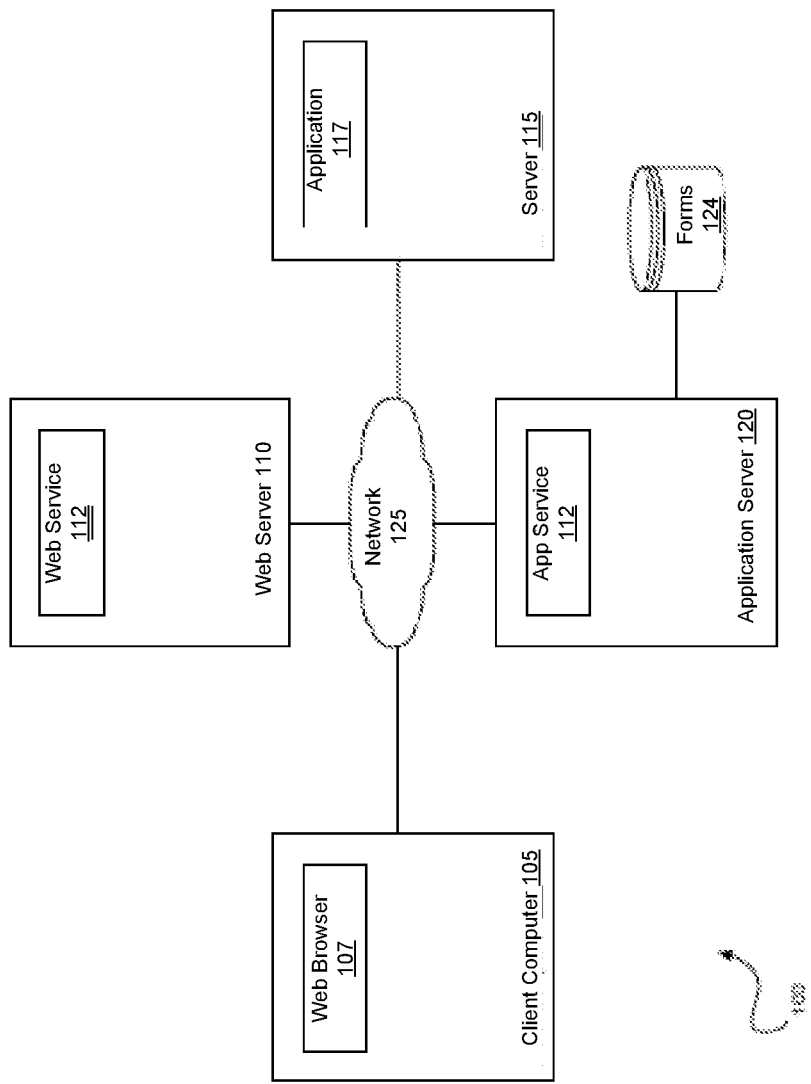
FIG. 1 is a block diagram of an illustrative computing system configured to perform domain concept discovery and clustering using word embedding in a dialogue design according to an embodiment.

An embodiment of a system and method measures a similarity between a word and one or more clusters to determine a cluster that maximizes mutual information between the word and a cluster probability model. An implementation may use a log-linear model algorithm that is directly applied to word vector representations. A log-linear model is a mathematical model that takes the form of a function whose logarithm is a linear combination of the parameters of the model, which makes it possible to apply (possibly multivariate) linear regression. Illustrative vector representations include encode-decode type vector representations, global vectors (GloVe) representations, or statistical co-occurrence based vector representations.

According to one aspect, the system may use the vector representations trained on large corpora, such as GloVe and Word2vec. Word2vec is a group of related models that are used to produce word embedding. Word embedding is the collective name for a set of language modeling and feature learning techniques in natural language processing (NLP) where words or phrases from the vocabulary are mapped to vectors of real numbers. For instance, word embedding may include a mathematical embedding from a space with one dimension per word to a continuous vector space with a lower dimension.

According to another aspect, the system uses position semantic tagging. According to another aspect, the system adapts a word representation to a domain (when determined necessary) by retraining the word representation. In yet another aspect, a clustering algorithm is selected based on a mutual information criterion for optimization. The system of another or the same embodiment may use the vocabulary harvested from domain specific documents to cluster. In another aspect, the system uses domain specific clusters as concepts and for variation generation in the dialogue design.

An embodiment of the system leverages semantic information captured in word embeddings and applies the semantic information to the dialogue design. The system may tokenize domain specific documents by extracting words contained in the documents and compiling a lexicon, or vocabulary. The system may convert the words to vectors, or word embeddings, using pre-trained vectors (e.g., from Word2Vec or GloVe) or by training vectors using the domain specific documents and using popular methods like Word2Vec or GloVe. The system may run a clustering algorithm, as described herein. The system may determine or otherwise locate clusters around words of interest and use them in entities population and variations generation for the dialogue design. In the case of an insurance example, for instance, words of interest might include illness and payments.

The maximum mutual information clustering algorithm may use a variety of distance and similarity criteria for a bottom-up clustering result. In one example, the algorithm clusters vectors representing the word embeddings by maximizing the mutual information between elements that are clustered together.

Pointwise mutual information (PMI) is measure of association comprising a log ratio between a word w and the word's context c's joint probability and the product of their marginal probabilities. PMI has been used as a criterion between words as a metric for our clustering algorithm.

Clustering includes partitioning a set of sample points (e.g., belonging to a high-dimensional space) into groups according to some criterion. In supervised clustering, there is a ground truth where the correct cluster assignment for each sample point is known. In unsupervised clustering, there is no explicit ground truth. In unsupervised clustering, there is only an assumption that points (e.g., words) with similar meanings are close to each other in the semantic space of word embeddings. An embodiment of the system automatically finds clusters such that words in any given cluster will have similar or related meanings according to human judgment. Thus, it may be desirable to have words that describe, for example, items related to "payments," such as "cost," "amount," and "expenses," to appear in one cluster, and medical words such as "disease" and "ailment" to be in another.

Clusters may be designed to be informative. Accordingly, the system may track and create the highest determinable incidences of mutual information between word identity and cluster assignment. The cluster identity provides information about an identity of a word. Mathematically, if there are k clusters, then mutual information achieves its maximum value if all clusters are of equal size, while the minimum I=0 occurs in the useless case where all words belong to the same cluster.

The mutual information metric may be trivially maximized by random assignment of words to clusters under the constraint of equal (or as nearly equal as possible) cluster sizes. Therefore, an additional feature may be imposed: words belonging to the same cluster should be close to each other in the semantic space while they should, as much as possible, be farther away from words belonging to other clusters. Thinking of each cluster as a region in the word embedding space, words near the boundary of that region are the ones most likely to be near other clusters, hence it is desirable to minimize the size of the boundary for a given volume of a cluster region. This means that it is desirable for these regions to be approximately spherical. Differentiable cluster parameters may be used in order to realize gradient-based optimization methods. The system may use a soft cluster model in which any given point $x_j$ is not assigned categorically to a single cluster, but its membership (probability) in cluster $S_i$ is a number $p(S_i, x_j) \in (0,1)$.

In one example, the system may categorize a set of n unlabeled observed vectors: $(x_1, x_2, \ldots, x_n)$, into k clusters belonging to cluster space: $S=(S_1, S_2, \ldots, S_k)$. The system may designate each sample point's cluster membership as being probabilistic in order to obtain a smooth, differentiable objective function. The squared distance from a vector $x_j$ to a cluster center $\mu_1$ is:

$$d_{ij} = \|x_j - \mu_i\|^2 = \sum_m (x_{jm} - \mu_{im})^2$$

where the index m denotes the m-th components ($1 \leq m \leq M$) of vectors $x_j$ and $\mu_i$, respectively. Further, we define $q_{ij} = e^{-d_{ij}}$ as a Gaussian density kernel or $$q_{ij} \equiv gc^{-d_{ij}} + \frac{c}{1+d_{ij}^2}$$

Gaussian-like density kernel, with a Cauchy distribution component in order to address numerical instabilities from vanishing gradients, where g+c=1. An embodiment may define $z_j$ as the normalizing factor that converts the $q_{ij}$ to cluster membership probabilities for the vector $x_j$:

$$z_j = \sum_{i=1}^{k} q_{ij}.$$

The conditional probability of class $S_i$, given vector $x_j$, may be $$p(S_i \mid x_j) = \frac{q_{ij}}{z_j}.$$

The system may select cluster centers $\mu_i$ so as to maximize the mutual information between the class identity and the vector for the given set of observed vectors $x_j$, $j \in \{0, 1, \ldots, n-1\}$. In general, the definition of mutual information is $$I(X; Y) = \sum_{y \in Y} \sum_{x \in X} p(x, y) \log\left(\frac{p(x, y)}{p(x)p(y)}\right), .$$

In a specific example, the mutual information is defined as:

$$I(S; X) = \sum_{i=1}^{k} \sum_{j=1}^{n} p(S_i, x_j) \log\left(\frac{p(S_i, x_j)}{p(S_i)p(x_j)}\right).$$

All vectors may be equally likely (and may be assumed as such by the system). Hence, the prior $p(x_j)$ is a constant independent of j. The joint distribution of the clusters $S_i$ and the vectors $x_j$ may be expressed by the product of the conditional and the marginal distributions:

$$p(S_i, x_j) = p(S_i | x_j) p(x_j) = \frac{q_{ij}}{n \cdot z_j}.$$

The system may sum over j to get the marginal distribution of $p(S_i)$ of the clusters:

$$p(S_i) = \frac{1}{n} \sum_{j=1}^{n} \frac{q_{ij}}{z_j}.$$

By substituting this equation into the mutual information calculation, the system may determine the quantity that needs to be maximized:

$$I(S; X) = \frac{1}{n} \sum_{j=1}^{n} \frac{1}{z_j} \sum_{i=1}^{k} q_{ij} \log\left(\frac{q_{ij}}{z_j p(S_i)}\right).$$

The system may execute the algorithm to read vocabulary and extract trained word embeddings from a domain specific corpus. For efficiency, the algorithm may be multi-threaded to take advantage of available multiple processor cores. The algorithm may be executed to assign the initial cluster centers to random locations around the origin.

The i-th such center may correspond may correspond to the $\mu_i$ vector. The algorithm may also load the vectors for all the words in the vocabulary that is being processed (i.e., the vector for the j-th word being $x_j$). At each iteration, the system may go over the whole dataset of words and calculate the distance of each word in the vocabulary from each cluster center. The system may then calculate the total mutual information $I(S;X)$ for the corpus using the above equation.

The system may take the negative of the resultant quantity as the objective function to be minimized. The system may iteratively calculate the derivative with respect to $\mu_i$ by chain-rule backpropagation, and then move the cluster centers $\mu_i$ along the gradient to reduce the value of the objective function. Stated differently, the system uses an iterative derivative gradient (i.e., a gradient produced based on a derivative that was iteratively calculated) to move the nominal center the clusters. The length of the action may be controlled by a learning-rate hyperparameter. The implementation may be a pure gradient descent approach, rather than a stochastic gradient one.

An additional innovative optimization features may include step length adjustment attempts to keep the angle between successive gradients at a set point. The algorithm may increment the step length by an amount proportional to a difference between the cosine of the observed angle and the cosine of the set point angle. The coefficient of proportionality and the set point may be meta-parameters. By itself, this adjustment by the system may not lead to the most rapid convergence in all situations, but allows may allow the algorithm executed by a processor of the system to explore more directions and not get stuck.

The system may also attempt to keep the contribution of higher-than-second-order terms below a set point value. Step length may be reduced by a pre-defined factor if the magnitude of higher-order terms exceeds the set point value. This set point value and the reduction factor may, again, be meta-parameters.

By working in an approximately quadratic realm, the algorithm may avoid having a Hessian matrix undergo rapid changes. If the function value moves in the wrong direction, the step size may be reduced by a prescribed factor (e.g., another meta-parameter). The set point value in this instance is 0 (e.g., there is no change in the function value). If the change is on the wrong side of zero, the step size may be reduced. The derivative of the objective w.r.t. the scaling constant r may also be obtained from using the above equation during the optimization process of the system and may involve the adjustment $\bar{d}_{ij}$ based on the move of the cluster centers:

$$\bar{r} = -2r^{-3} \sum_{i=1}^{k} \sum_{j=1}^{n} \bar{d}_{ij} \sum_{m} (x_{jm} - \mu_{im})^2$$

The system may use this derivative in the optimization processes in order to automatically scale the radius of the clusters, and thus, achieve or otherwise determine convergence.

FIG. 1 illustrates an example computing environment 100 according to one embodiment. As shown, the computing environment 100 includes a client computer 105, a web server 110, a server 115, and an application server 120. The client computer 105 may be a physical system (e.g., a desktop, laptop computer, mobile device, etc.) or a virtual computing instance executing in the cloud. The client computer 105 includes a web browser 107. A user may access data services through the web browser 107 over a network 125 (e.g., the Internet).

For instance, a user may access a web service 112 executing on a web server 110. In one embodiment, the web service 112 provides a web interface for an application server 120 (e.g., executing an application service 122). More specifically, the application service 122 provides a database of online forms 124. The forms 124 include data presented to users on the web browser 107.

Figure 2:
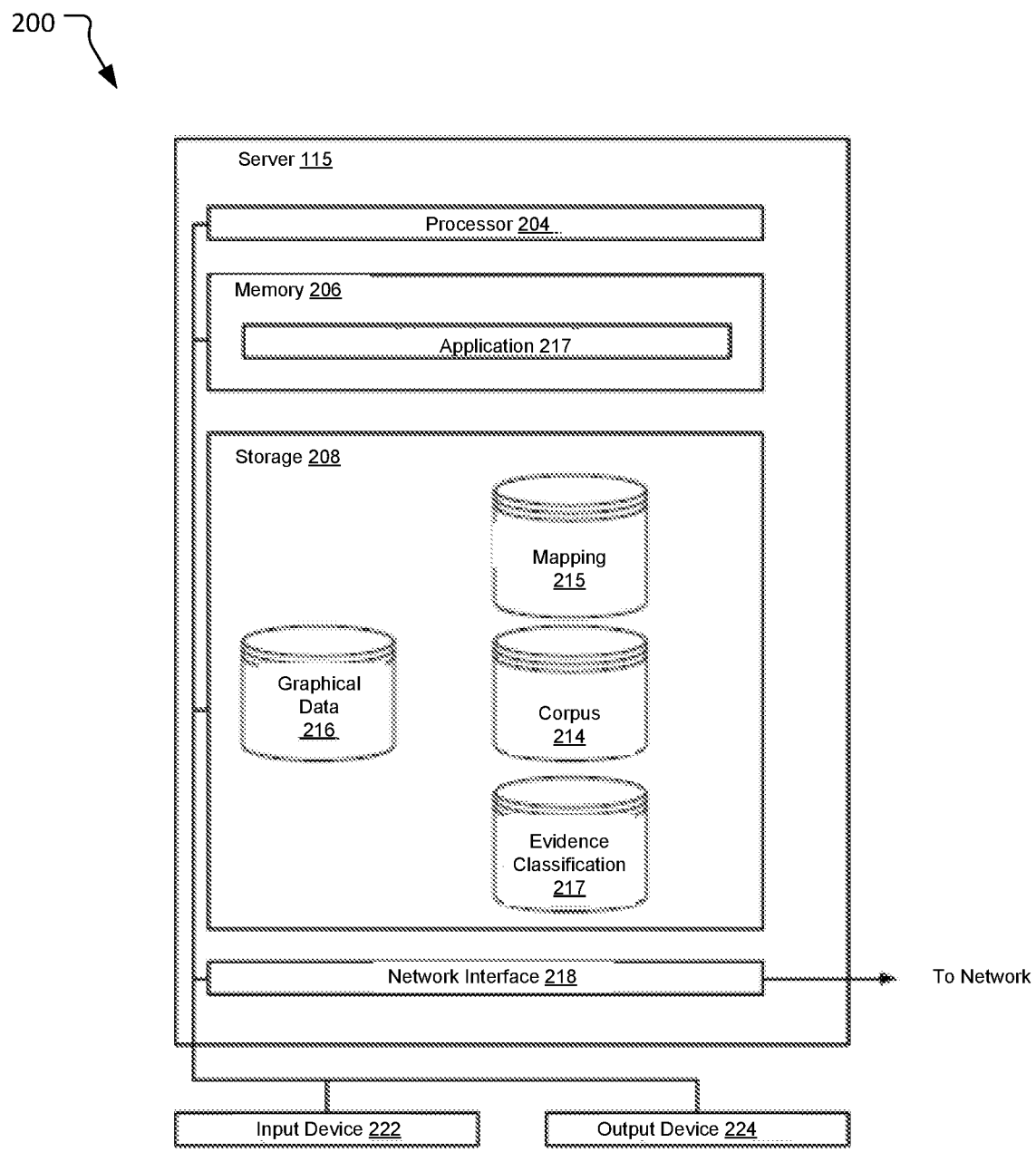
FIG. 2 is a block diagram showing certain computing modules of the computing system of FIG. 1 in greater detail.

FIG. 2 further illustrates the server 115, according to one embodiment. The server 115 generally includes a processor 204 connected via a bus to a memory 206, a network interface device 218, a storage 208, an input device 222, and an output device 224. The server 115 is generally under the control of an operating system. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. Similarly, the memory 106 may be a random access memory. While the memory 206 is shown as a single identity, it should be understood that the memory 206 may comprise a plurality of modules, and that the memory 206 may exist at multiple levels, from high speed registers and caches to lower speed but larger DRAM chips. The network interface device 218 may be any type of network communications device allowing the navigation server 110 to communicate with other computers via the network 125.

The storage 208 may be a persistent storage device. Although the storage 208 is shown as a single unit, the storage 208 may be a combination of fixed and/or removable storage devices, such as fixed disc drives, solid state drives, removable memory cards, optical storage and network storage systems.

As shown, the memory 206 contains the application 117, which is an application generally executed to take actions described herein. Storage 208 contains the corpus 214, mapping 215, and graphical data. The corpus 214 is a body of information used by the QA application 117 to generate answers to cases. For example, the corpus 214 may contain dictionary definitions and the forms 124. Mapping 215 may store a mapping between question context and features.

The input device 222 may provide a keyboard and/or a mouse, etc. The output device 224 may be any conventional display screen. Although shown separately from the input device 222, the output device 224 and input device 222 may be combined. For example, a display screen with an integrated touch-screen may be used.

In one particular implementation, the corpus 214 includes insurance documents are received and processed/prepared by the system in order to extract entities (e.g., around 4,500). The system clusters the entities. Six datasets may exist for word similarity and two analogy datasets.

More particularly, the insurance data in the example includes web documents and policy documents. The system tokenizes the data and keeps distinct instances of words that compose in essence the insurance vocabulary (e.g., around 3,500 words). The system may convert the words into vectors using pre-trained sets or word embeddings. For example, the system may use Word2Vec embeddings or GoogleNews-vectors-negative300. The dataset may include 300-dimensional vectors for 3 million words and phrases. The words (e.g., focused on ailments) from the insurance vocabulary that clustered are shown in the table of FIG. 3.

Figure 5:
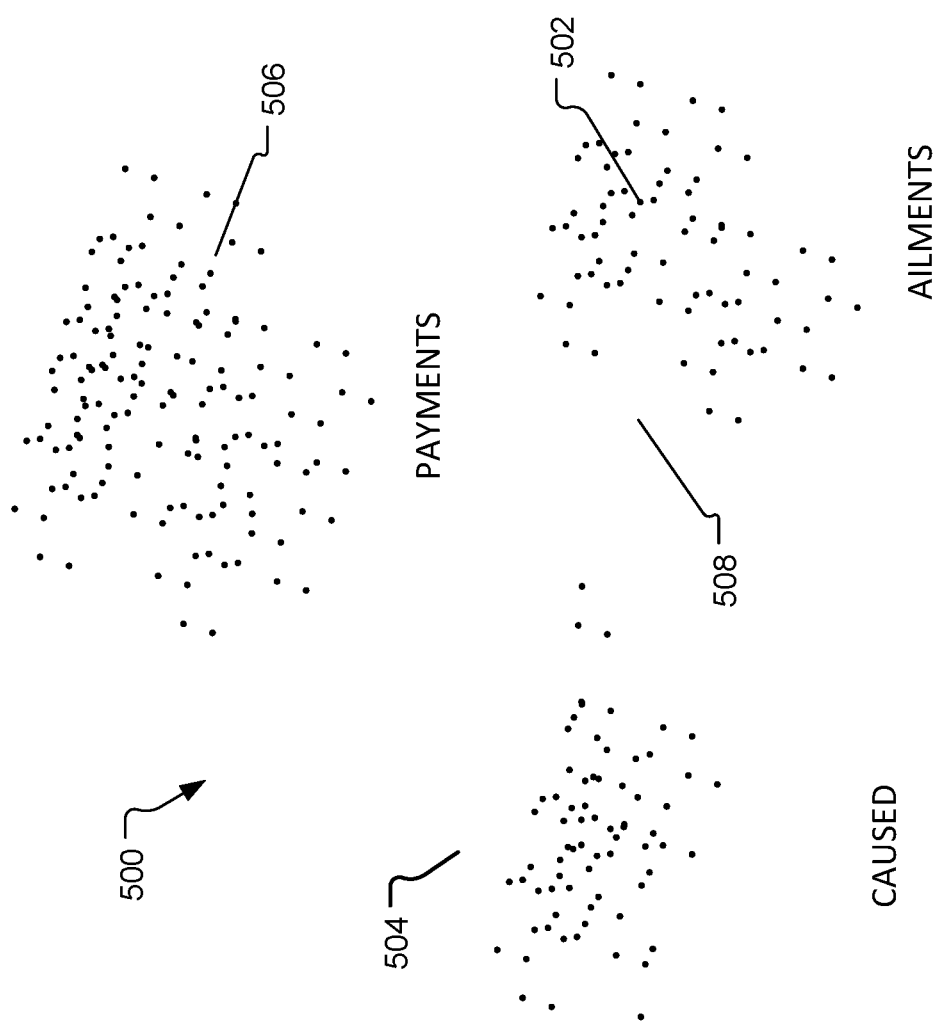
FIG. 5 shows a graphical depiction of multiple clusters as may be generated by the system of FIG. 1.

For illustrative purposes, the words are shown in FIG. 4 plotted on a 2-D space based on their calculated similarity to the center of a cluster. FIG. 5 is a diagram showing three clusters, including the cluster of FIG. 5 (i.e., ailments). The clusters created by the system are separated distinctly. To visualize the distinctions, the words from the three clusters are projected using their 300 dimensional Word2Vec vector representation to two dimensions using principal components analysis (PCA). In FIG. 3, the clusters generated by the system may be centered on ailments 502, caused 504, and payments 506. The clustering algorithm of the system may generate clusters of words (represented by data points) to be spherical, distinct, and as far, or separated, from each other as possible, among other parameters. A relation may be detected along borders of clusters. For instance, a border 408 of the ailments cluster 502 and caused cluster 504 may indicate an association between two edge words (e.g., anxiety and taxes) of each respective cluster 502, 504. The closeness of the bordering words may indicate their semantic relatedness to the system executing the algorithm. The clusters 502, 504 to which the words belong may indicate the cause-and-effect relation of the bordering words.

While the cluster configuration of FIG. 5 was generated using Word2Vec, one of skill in the art will appreciate that other programs, such as GloVe, may be executed by the system to generate other useful results. In a particular example, clustering based on GloVe embedding may place the word "termination" in the ailments cluster (e.g., associated with the termination of a condition or life). Clustering on Word2Vec embedding may place "termination" in a different semantic cluster along with words like cancellation, delay, suspend, or deferment. In this manner, the system may provide multiple representations that have captured different context of the word. Determining clustering on both representations may provide the dialog designer with valuable insights. The system may train on general domain documents to create word embeddings that are somewhere in-between the vectors for the different meanings of the word.

Figure 6:
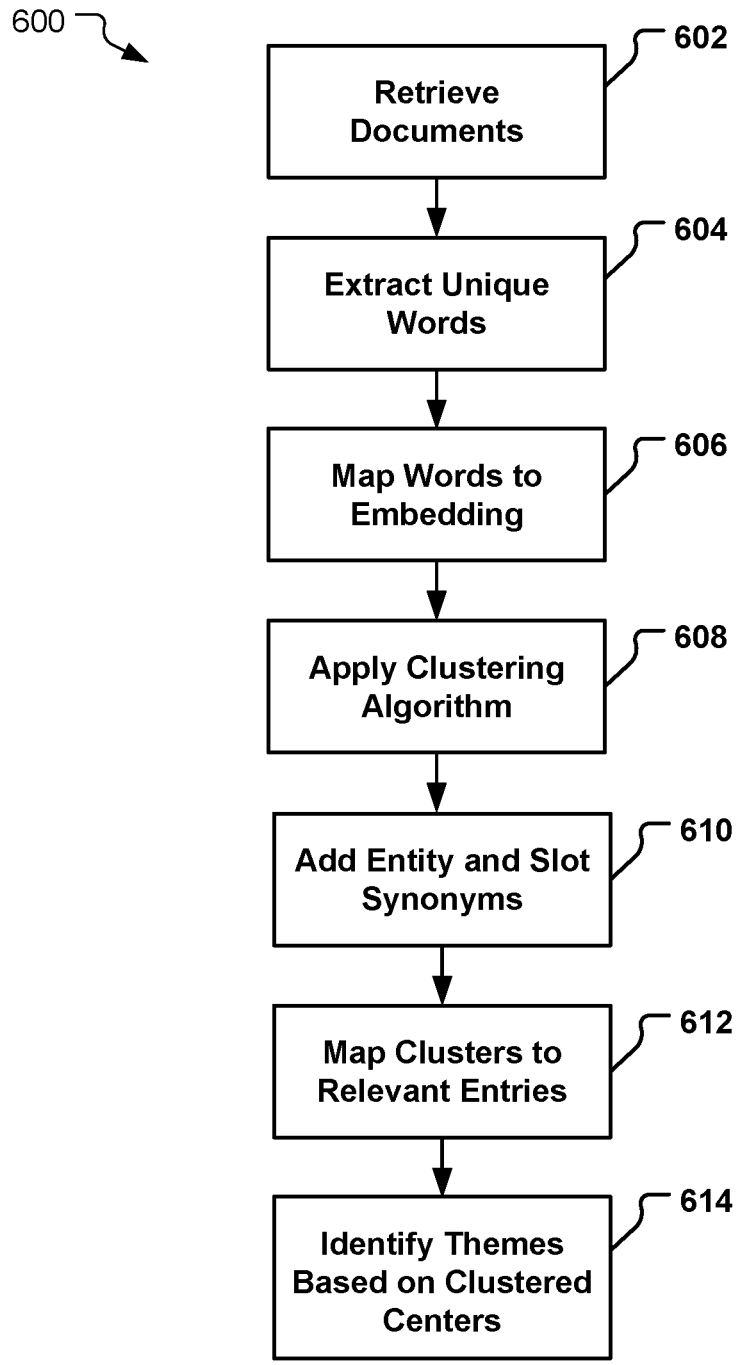
FIG. 6 is a flowchart including processes executed by the processor of FIG. 1 to use word embedding in a dialogue design according to an embodiment.

FIG. 6 is a flowchart that includes processes executable by a computing system to use word embedding in a dialogue design according to an embodiment. The system at 602 may receive documents, such as legal or insurance data. The system may extract unique words at 604.

The system at 606 may map words to embedding, and apply a clustering algorithm at 608. The clustering algorithm may be executed to automatically determine a number of clusters and to choose a radii of the clusters.

An entity and a slot synonym may be automatically added at 610. The system may map clusters to relevant entities at 612. At 614, the system may identify themes based on clustered centers.

An embodiment of the system uses a cosine distance instead of a Euclidean distance in the clustering algorithm. Use of the cosine distance may result in better semantic matching than the Euclidean distance. Other embodiments may use the Euclidean distance or another measurement.

In some instances, the system may use a tunable scaling factor to change the Gaussian cluster. The system may apply a scaling factor by scaling the angle between vectors rather than the length of the vectors.

In operation, the system may automatically cluster words/entities according to their meaning. The logic may be extended to clustering triplets (e.g., word-relation-word). The system may accomplish the clustering without semantic parsing or position semantic tagging or another preprocessing method. The clusters may be used in a knowledge graph for implicit dialog and entity resolution in explicit dialog.

The system may introduce variations with alternatives for various words and concepts. Concept lists may be populated by the system to increase accuracy. The system may allow for the automatic expansion of the semantic space during graph creation. Elements may be automatically matched based on their semantic meaning during the graph query. The system may further adapt a word representation to the domain if needed by retraining the word representations. The system may use vocabulary automatically harvested from domain specific documents for clustering. The system may use the labels of these clusters as a way to automatically discover entity types for variation generation in the dialog system. The system may accomplish automatic creation and query matching, including the expansion and matching of triplets.

The system may automatically select cluster radii to focus results. An embodiment of the system may add a kernel that dissipates polynomially (e.g., one that is scaled with a small coefficient). The kernel may resolve instabilities in convergence of the algorithm. Regarding scaling of the kernel, the system may automatically increase or decrease the scaling factor based on how close to the highest possible mutual information that data is when the algorithm converges.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

The invention claimed is:

1. A method to perform automated domain concept discovery and clustering, the method comprising:
    receiving a set of documents for natural language processing for a domain;
    representing a plurality of entries in the set of documents as a plurality of continuous vector representations in a high dimensional continuous space;
    applying a log-linear model algorithm to the plurality of continuous vector representations;
    applying a clustering algorithm to discover domain concepts based on a mutual information optimization criterion to form a set of clusters;
    associating each entry of the plurality of entries with each cluster in the set of clusters through formalizing an evidence based model of each cluster given each entry;
    calculating a mutual information between each entry and each cluster using the evidence based model;
    identifying a nominal center of each cluster by maximizing a corresponding calculated mutual information of that cluster;
    calculating an iterative derivative gradient with respect to the plurality of continuous vector representations via chain-rule backpropagation, wherein a number of iterations in calculating the iterative derivate gradient is controlled via a learning-rate hyperparameter; and
    moving the nominal center of each cluster along the iterative derivative gradient to thereby reduce a value of an objective function of the clustering algorithm via a pure gradient descent approach.

2. The method of claim 1, wherein a continuous vector representation of the plurality of continuous vector representations uses a pre-trained word embedding.

3. The method of claim 2, wherein the each entry is selected from a group consisting of an entity, a concept, and a relationship.

4. The method of claim 3, wherein the group is communicated in a knowledge graph.

5. The method of claim 1, wherein the documents include corpus or a body of works.

6. The method of claim 1, wherein the entries include words or phrases.

7. The method of claim 1, wherein the evidence based model includes a posterior probability model.

8. The method of claim 1, wherein representing the entries includes extracting a unique word.

9. The method of claim 1, wherein representing the entries includes mapping a word.

10. The method of claim 1, further comprising adding an entity synonym.

11. The method of claim 1, further comprising adding a slot synonym.

12. The method of claim 1, wherein associating each entry further comprises mapping each cluster to each entry.

13. The method of claim 1, further comprising identifying a theme based on the set of clusters.

14. The method of claim 1, wherein identifying the nominal center of each cluster by maximizing the mutual information includes determining a cosine distance between each entity included in each cluster.

15. An apparatus comprising:
    a memory storing program code; and
    a processor configured to access the memory and execute the program code to receive a set of documents for natural language processing for a domain, represent a plurality of entries in the set of documents as continuous vectors in a high dimensional continuous space, apply a log-linear model algorithm to the continuous vectors, apply a clustering algorithm to discover domain concepts based on a mutual information optimization criterion to form a set of clusters, associate each entry of the plurality of entries with each cluster in the set of clusters through formalizing an evidence based model of each cluster given each entry, calculate a mutual information between each entry and each cluster using the evidence based model, identify a nominal center of each cluster in the set of clusters by maximizing a corresponding calculated mutual information of that cluster, calculate an iterative derivative gradient with respect to the plurality of continuous vector representations via chain-rule backpropagation, wherein a number of iterations in calculating the iterative derivate gradient is controlled via a learning-rate hyperparameter, and move the nominal center of each cluster along the iterative derivative gradient to thereby reduce a value of an objective function of the clustering algorithm via a pure gradient descent approach.

16. The apparatus of claim 15, wherein the mutual information optimization criterion includes pointwise mutual information.

17. The apparatus of claim 15, wherein the processor is further configured to extract a word included in the set of documents.

18. The apparatus of claim 17, wherein the processor is further configured to compile a lexicon using the word.

19. A program product to perform automated domain concept discovery and clustering, the program product comprising:

a computer readable storage medium having computer readable program code embodied therewith, the computer readable program code being executable by a processor to receive a set of documents for natural language processing for a domain, represent a plurality of entries in the set of documents as continuous vectors in a high dimensional continuous space, apply a log-linear model algorithm to the continuous vectors, apply a clustering algorithm to discover domain concepts based on a mutual information optimization criterion to form a set of clusters, associate each entry of the plurality of entries with each cluster in the set of clusters through formalizing an evidence based model of each cluster given each entry, calculate a mutual information between each entry and each cluster using the evidence based model, identify a nominal center of each cluster in the set of clusters by maximizing a corresponding calculated mutual information of that cluster, calculate an iterative derivative gradient with respect to the plurality of continuous vector representations via chain-rule backpropagation, wherein a number of iterations in calculating the iterative derivate gradient is controlled via a learning-rate hyperparameter, and move the nominal center of each cluster along the iterative derivative gradient to thereby reduce a value of an objective function of the clustering algorithm via a pure gradient descent approach.

* * * * *